United States Patent [19]

Clements

[11] Patent Number: 5,485,628
[45] Date of Patent: Jan. 16, 1996

[54] RENEWAL MANAGEMENT SYSTEM

[76] Inventor: Jay S. Clements, 307 N. Louise, Atlanta, Cass County, Tex. 75551

[21] Appl. No.: 79,948

[22] Filed: Jun. 23, 1993

[51] Int. Cl.$^6$ ................................................ G06F 7/08
[52] U.S. Cl. .................... 395/800; 235/381; 364/DIG. 1; 364/237; 364/266; 364/260
[58] Field of Search ........................... 395/800, 425, 395/700, 375, 725, 550; 235/380, 381, 392; 340/627, 566, 932.2; 364/464.04

[56] References Cited

U.S. PATENT DOCUMENTS

| | | | |
|---|---|---|---|
| 3,778,637 | 12/1973 | Arita | 302/130 |
| 4,162,530 | 7/1979 | Kusui et al. | 364/464 |
| 4,240,030 | 12/1980 | Bateman et al. | 324/110 |
| 4,254,414 | 3/1981 | Street et al. | 340/627 |
| 4,351,028 | 9/1982 | Peddie et al. | 364/483 |
| 4,568,920 | 2/1986 | Mombelli | 340/566 |
| 4,575,622 | 3/1986 | Pellegrini | 235/382 |
| 4,629,874 | 12/1986 | Pugsley et al. | 235/380 |
| 4,731,575 | 3/1988 | Sloan | 235/381 |
| 4,777,354 | 10/1988 | Thomas | 235/380 |
| 4,795,892 | 1/1989 | Gilmore et al. | 235/381 |
| 4,803,632 | 2/1989 | Frew et al. | 369/464.04 |
| 4,876,540 | 10/1989 | Berthon et al. | 340/932.2 |
| 4,908,769 | 3/1990 | Vaughan et al. | 369/464.04 |
| 5,146,067 | 9/1992 | Sloan et al. | 235/381 |

Primary Examiner—Mehmet Geckil
Attorney, Agent, or Firm—Harold E. Meier

[57] ABSTRACT

A system for enabling a central location to control a service at a plurality of remote locations. The system includes a plurality of control modules for controlling the length of time for actuation of a switch at remote locations. A magnetic stripe card programs one of the plurality control modules to provide a service to the remote location for a predetermined period of time. The magnetic stripe card also programs the remote control module with a series of progressive warning modes. A central site manager programs the magnetic stripe cards for use with a specific control module. The central site manager contains a storage means containing information concerning each control module under the control of the site manager and information concerning all of the magnetic stripe cards issued by the central site manager.

4 Claims, 5 Drawing Sheets

RENEWAL MANAGEMENT SYSTEM

TECHNICAL FIELD

The present invention relates to a system for controlling the length of time for actuation of a switch at a plurality of remote locations, and more particularly to a system for renewable control of the length of time for actuation of a switch at a plurality of remote locations from a central control site.

BACKGROUND OF THE INVENTION

The owners and operators of business or residential properties consisting of individual units, such as apartment complexes, are faced with the problem of maintaining control over their properties. The owner of a property will normally have an interest in controlling the services and activities at a particular unit. Examples of this would include supplying utilities or controlling access to the unit. This type of control is desirable to limit the liability of the property owner for services provided at the unit, to reliably control tenant access to a rental unit, and to reliably control activities at the unit.

Present methods for providing property owners control over their property are not sufficiently effective. In order to discontinue most utilities to a unit the property owner is required to work through a utility provider which is time consuming and costly. The property owner may control access to the unit by changing locks on the doors to the unit, but this also entails considerable cost and effort. Finally, many services or products provided at a rental unit may only be controlled by on-site monitoring. However, on-site monitoring is costly and inefficient. Thus, a need has arisen for a system that allows a property owner or operator to remotely control services, access, products and activities at a designated property.

SUMMARY OF THE INVENTION

The present invention overcomes the foregoing and other problems with a renewal management system. A central site manager comprises a PC based unit capable of programming a variety of magnetic stripe cards with data allowing the actuation of a switch closure or opening at a remote location. The magnetic stripe cards are used to program a control module at the remote location. The central site manager maintains a database of information on the control modules and a database of information concerning each magnetic stripe card issued by the system. The site manager also maintains a security function to control access to system information.

A magnetic card reader/writer mechanism interfaced with the PC unit allows the central site manager to program a magnetic stripe card with instructions for a particular control module. A card is programmed with instructions detailing the length of time a remote location is to be maintained in normal operation and the progressive alert procedures notifying a user at the remote location of a pending operation interrupt.

The control module comprises a microprocessor responsive to instructions retrieved from the magnetic stripe card via a magnetic stripe reader. The retrieved instructions are stored within a nonvolatile random access memory. In response to these instructions the microprocessor initiates a process after a predetermined time period has expired to discontinue providing a product or service. Prior to discontinuing providing a product or service, progressive alert modes provide both visual and audio warnings to the user at the remote location. The control module also contains a computer interface port allowing diagnostic procedures to be carried out on the control module.

DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
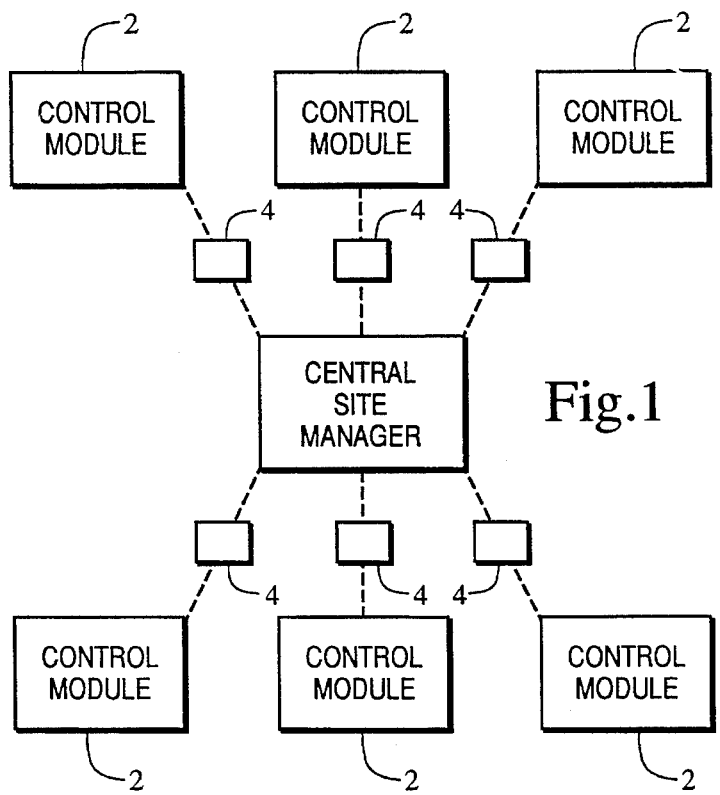
FIG. 1 is a block diagram illustrating the overall structure of the renewal management system.

Referring now to the Drawings, and more particularly to FIG. 1, there is a block diagram illustrating the overall structure of the renewal management system. A control module 2 is located at each remote location where there is a need to control the length of time for actuation of a switch providing a particular product or service, for example, the control of electric service. Actuation of the switch providing service to the property is achieved using a magnetic stripe card 4, containing programming instructions for the control module 2. It is to be understood that while the preferred embodiment of this invention describes the use of a magnetic stripe card to actuate the control module, any type of card storage device, such as a bar code, OCR, or memory card, may be used to initiate the control module 2. The magnetic stripe cards 4 are programmed at a central site manager 6 wherein instructions are generated and entered. These instructions control the length of time a switch will be actuated through operation of the control module, and the operation of the progressive alarm modes.

Figure 2:
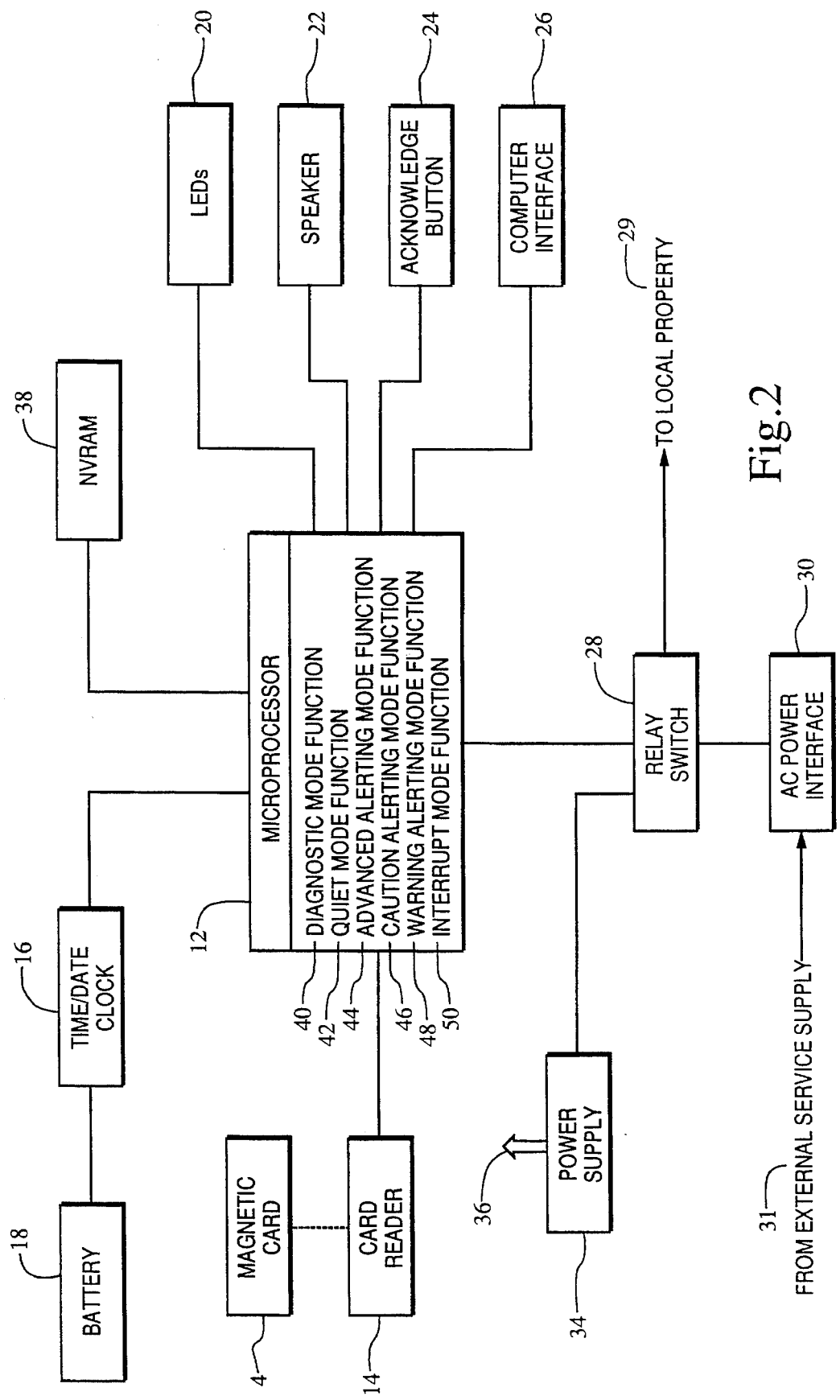
FIG. 2 is a block diagram illustrating the control module of the present invention.

Referring now to FIG. 2, there is a block diagram illustrating the control module 2 located at each remote location. A control processor 12 controls all functions within the control module 2. A card reader 14 reads a magnetic stripe card 4 providing the module 2 with instructions describing the time period to switch actuation and the instructions for operating the progressive alarm modes at the remote location.

A time/date clock 16 connects to the microprocessor 12 enabling the processor to track the time period until switch actuation and the time periods between the various alert modes. A battery 18 provides power to the time/date clock 16 when main power is disconnected from the system. A display of LEDs 20, one green, one yellow and one red, provide the module 2 with a visual alarm for notifying an individual at the remote location of an imminent lapse of time and discontinuance of a service, an audio alarm speaker 22 provides an audio alarm.

An acknowledge button 24 enables an individual at the remote location to discontinue the audio and/or visual alarms. Pressing the button 24 acknowledges that an individual at the remote location is aware of the pending switch actuation and service disconnection and discontinues the present alarm mode. A computer interface 26 enables a computer to be attached to the control module 2 and perform diagnostic and maintenance functions on the module.

A service is provided to the local property 29 from an external service source 31 through a relay switch 28 and service interface 30. The relay switch 28 provides for disconnection of the local property 29 from the service interface 30 that connects the remote local property 29 with the external service source 31. The relay switch 28 is responsive to commands from the microprocessor 12. The external service source can be any application that can be remotely controlled, such as a power supply, water supply, cable supply or entrance to a unit.

The associated memory of the control processor 12 consists of a nonvolatile random access memory 38 (NVRAM) that stores operating instructions responsive to the programming instructions received from the magnetic stripe card 4. These instructions allow the control processor 12 to perform a variety of functions. A diagnostic function 40 enables communication between a portable computer interfaced with the control processor 12 through the computer interface 26. The diagnostic function requires a user to enter an access code to establish communications. Once communications are established, all internal data may be reviewed and/or changed. In this way, operational instructions for the control module 2 may be changed in a manner other than insertion of a new magnetic stripe card 4.

A quiet mode function 42 controls the operation of the control module while the module provides a service or product to the remote location. In this mode, the date and time are monitored to determine when to enter the first alerting mode. The quiet mode function 42 instructs the microprocessor 12 to illuminate the green LED 20. The yellow and red LEDs 20 are off as is the audio alarm speaker 22.

The advanced alerting mode function 44 initiates indication of a pending service interruption. The function 44 instructs the microprocessor to cause the green LED 20 to flash and to actuate the audio alarm speaker 22 at regular intervals. The caution alert mode function 46 initiates flashing of the yellow LED 20 and actuates the audio alarm speaker 22 at more frequent intervals. The warning alert mode function 48 causes the red LED 20 to start flashing and increases the frequency of the audio alarm speaker 22 activations. Finally, the disconnect mode function 50 instructs the microprocessor to began flashing all of the LEDs 20 and to again increase the frequency interval of the audio alarm speaker 22 activations. Following a predetermined interval, the function 50 instructs the microprocessor 12 to trip the relay switch 28 discontinuing a service or product at the remote location and from the control module 2.

Figure 3:
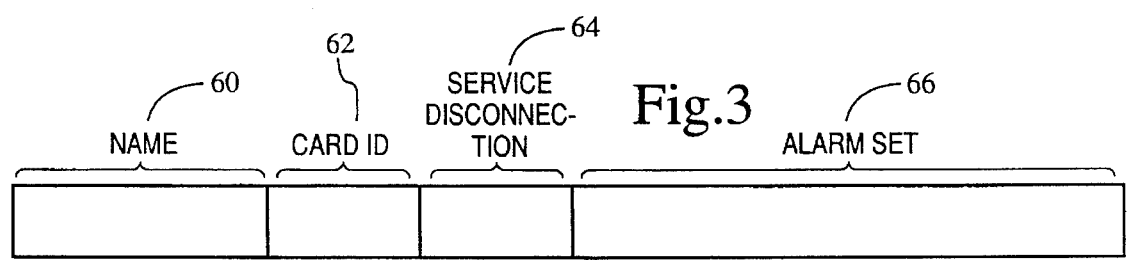
FIG. 3 is a diagram illustrating the data storage fields of the magnetic stripe card of the present invention.

Referring now to FIG. 3 there are illustrated the data fields within the memory area of a magnetic stripe card 4. A name field 60 has room for up to twenty-four characters indicating the name of the card owner. This information is used to aid in card inventory management and is not required by the control module 2. The card ID field 62 indicates the type or number of the card and contains room for up to seven digits. The card ID field 62 may indicate a master card capable of operating within all control module units controlled by the central site manager 6 or may indicate a unit card containing a number unique to a specific central site manager and a specific control module 2. Unit cards will only be operable at the indicated control module 2.

A service disconnection field 64 indicates the year, month, day and hour that the control module 2 is to enter the advanced alerting mode function 44. Alternatively, the field 64 may contain a number of hours from the date and time a card is read to begin the advanced alerting mode function 44. The service disconnection field 64 is configured to contain up to eight digits. The alarm set field 66 consists of a number of subfields containing information for programming the manner of operation of the various alert mode stages. This information includes the time interval occurring between audio alarm signals, the duration of the audio alarm signals and the time periods between the initiation of one alert mode and the next alert mode.

Figure 4:
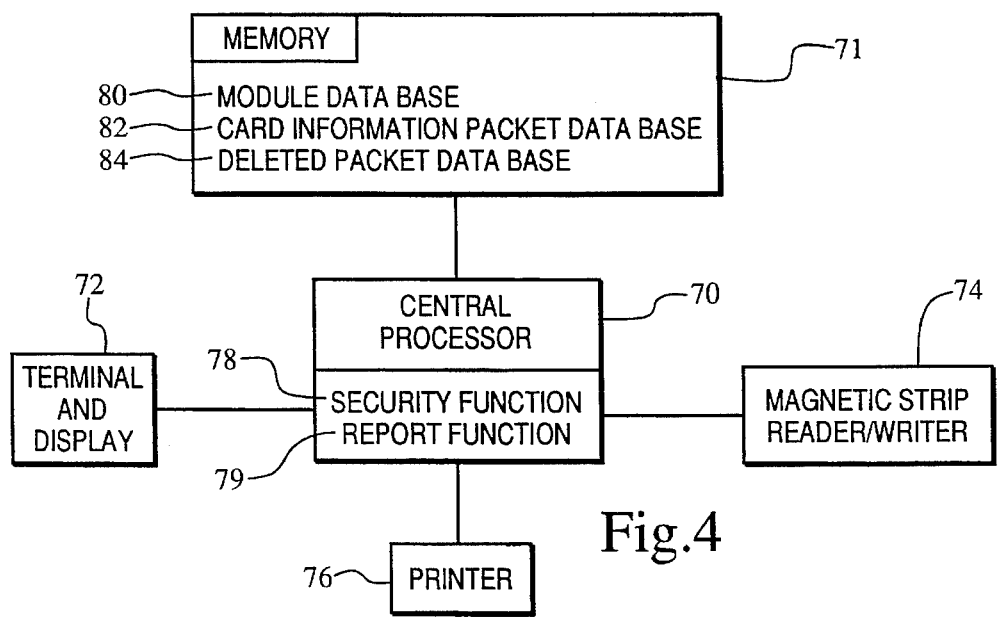
FIG. 4 is a block diagram illustrating the central site manager of the present invention.

Referring now to FIG. 4, there is a block diagram illustrating the central site manager 6 of the present invention. A central processor 70 connects with a terminal and display unit 72, allowing for user interaction with the central site manager 6. A magnetic stripe reader/writer 74 provides the ability to write programming instructions for a specific control module 2 to a magnetic stripe card 22 or to retrieve data stored on a magnetic stripe card. A printer 76 enables reports concerning control modules 2 under control of the central site manager 6 to be generated.

The central processor 70 contains a security function 78 requiring the input of one of two passwords to access the central site manager. A manager password enables read/write access to internal information and magnetic card data. An operator password enables read only access to internal information and card data. A report function 79 generates reports based on information within a module database 80 and a packet database 82 in response to requests from the terminal and display unit 72.

Associated with the central processor 70 is a memory 71 containing a number of databases. A module database 80 maintains a listing of all control modules 2 under the control of the central site manager 6. The data base 80 contains information concerning the last instructional update of each control module, when each control module is to be disconnected, and module identification information. A card information packet database 82 maintains information on each magnetic card 4 used by the renewal management, thus acting as an inventory control aid. The information identifies the control module 2 associated with a particular card 4; the card duplication number, indicating whether the card is an original or one of a maximum of nine duplicates that may be created; the name of the person to whom a card was issued; the disposition of the card, whether the card was issued to a user, maintenance personnel or is part of inventory; and the date and time the card data packet was last updated. New packets can be created and cards programmed for new control modules or for duplicate cards. Once created, information packets may be changed, as needed, providing the new information does not duplicate existing packets. A packet may be deleted when required. However, a deleted packet database 84 saves the deleted packet along with a brief description of why the packet was deleted.

Figure 5A:
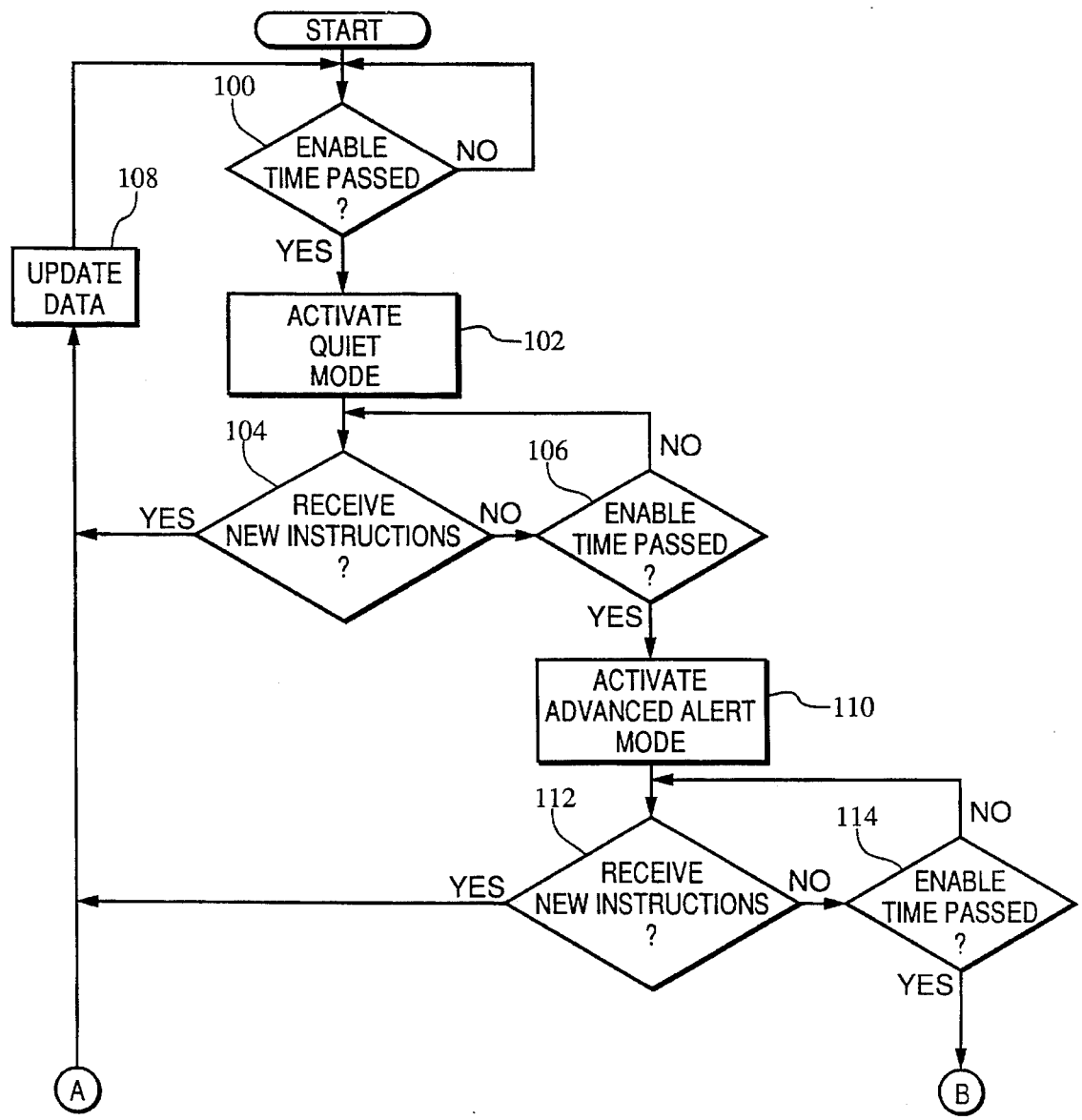
FIGS. 5a and 5b are flow diagrams illustrating the operating procedure of the control module.
Figure 5B:
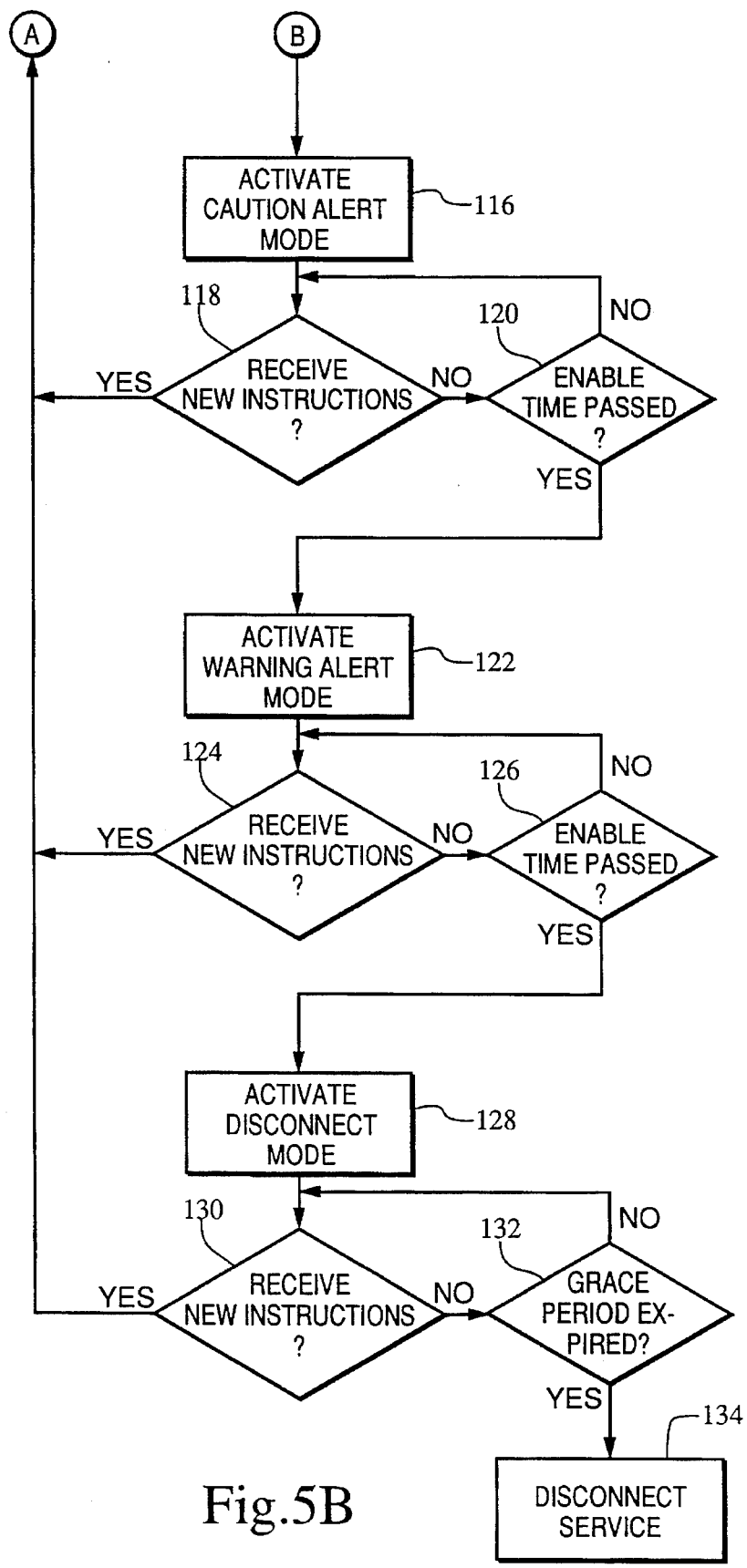

Referring now to FIGS. 5a and 5b, a flow chart illustrates the operating procedure of the control module. Once the system is enabled, inquiry step 100 monitors the system date/time clock 16 (FIG. 1) to determine if the time for enabling the initial alarm mode has been reached. Once the enable time is reached, the quiet mode is activated at step 102. The system determines, at inquiry step 104, if new instructions have been received by the control processor 12 (FIG. 1). If no instructions are received control passes to step 106 to determine if the time to enable the next alert mode has been reached. Control continues to loop between inquiry steps 104 and 106 until either a new set of instructions is received, at which point the data within the NVRAM 38 (FIG. 1) is updated at step 108, or until the time to enable the next alert mode is reached, at which point the advanced alert mode is activated at step 110.

Inquiry steps 112 and 114 monitor for either a new set of operating instructions or passage of the time period required to enable the next alert mode. If new instructions are received, control passes to step 108 to update the NVRAM data. If no new instructions are received once the correct time period has elapsed, the caution alert mode is activated at step 116. Steps 118 through 126 then monitor for new instructions and activate the warning alert mode at step 122 and the disconnect mode at step 128, in the same manner as described above, if no new instructions are received.

Once the disconnect mode is activated, the system inquires at step 130 if new instructions have been received. If instructions have been received the data is updated within the NVRAM at step 108. Otherwise, inquiry step 132 determines if the disconnect grace period has expired. If not, the module waits for new instructions until the grace period expires and service is disconnected at step 134.

Figure 6:
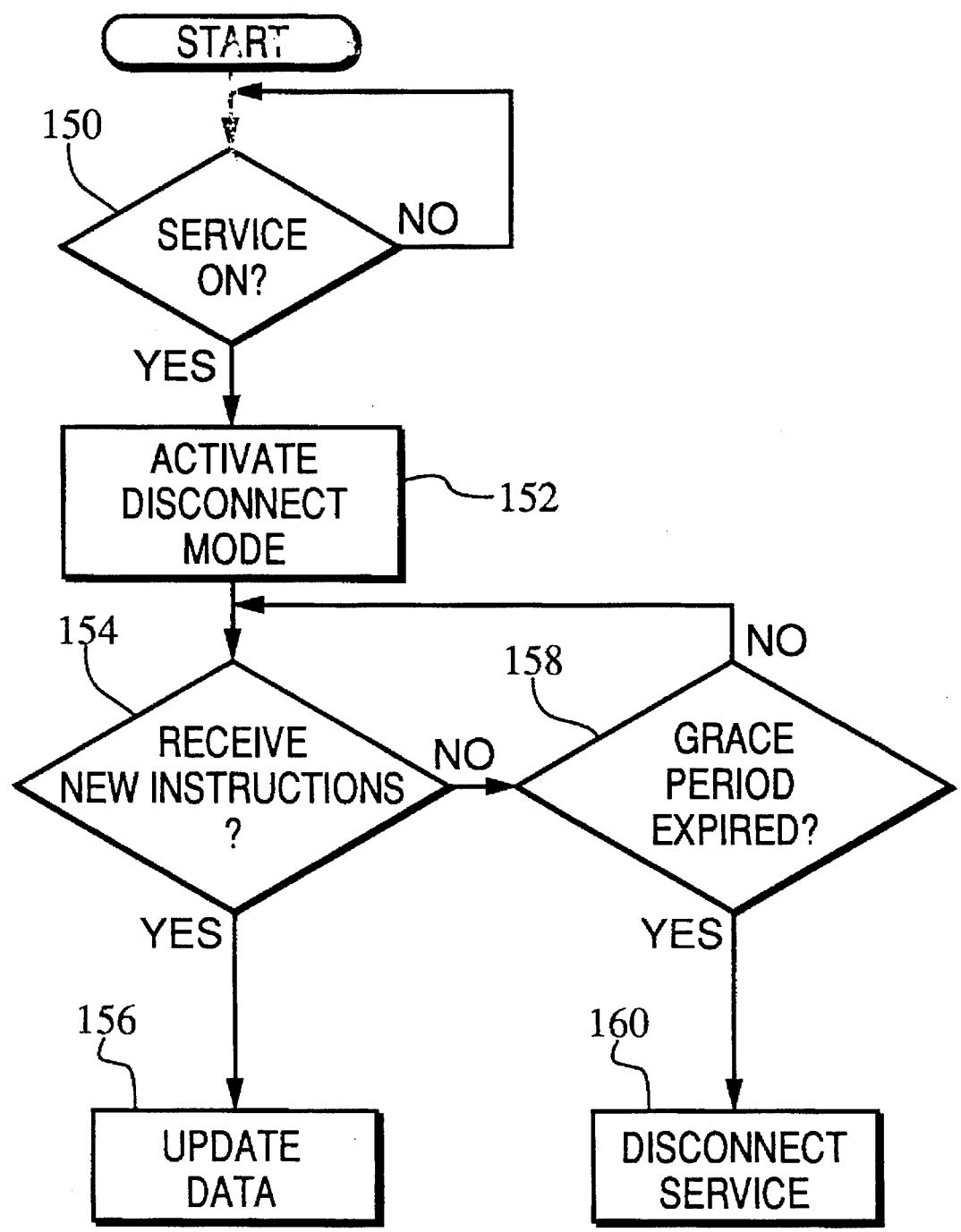
FIG. 6 is a flow diagram illustrating the start-up procedure of the control module.

Referring now to FIG. 6 there is illustrated a flow diagram describing the method of operation of the control module 2 when service is initiated after disconnection. Step 150 monitors for a service initiation condition within the control module 2. Once a service initiation condition is detected, the processor initiates the disconnect mode at step 152. The disconnect mode operates in the manner described with respect to FIGS. 5a and 5b. The processor will monitor for new instructions at step 154 and update at step 156 the data within the NVRAM with the instructions once the instructions are received. If instructions are not received, control passes to inquiry step 158 to determine if the grace period has expired. The system will continue to monitor for new instructions until the grace period expires and service is again disconnected at step 160.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the spirit of the invention.

I claim:

1. A system enabling a central location to control a time interval for actuation of a switch at a plurality of remote locations having control modules, comprising;

a central site controller at the central location for generating a set of programming instructions to provide switch actuation at a remote location after a predetermined period of time and to provide actuation and control of a plurality of progressive alarm modes at the remote location;

portable means for receiving and storing the set of programming instructions generated by the central site controller, and including means for enabling to enable transfer of the set of programming instructions to the plurality of remote locations; and a plurality of control modules at the plurality of remote locations receiving a set of programming instructions from said portable means and responsive to the set of programming instructions generated by the central site controller for controlling the actuation of a switch at any of the remote locations upon expiration of the predetermined period of time and for controlling actuation of the plurality of progressive alarm modes prior to the expiration of the predetermined period of time, each of the plurality of control modules comprising, means for reading the set of programming instructions from the portable means for storing;

processing means for generating operating signals in response to the set of programming instructions read by the means for reading;

means connected to the processing means for storing programming instructions for the control module;

means for monitoring the predetermined period of time, said means for monitoring including means for timing time periods between the progressive alarm modes; and means responsive to the operating signals for actuation of the switch at the remote location, wherein each alarm mode is activated successively and having programmable time periods between each successive alarm mode.

2. The system of claim 1 wherein the processing means further comprises means for performing diagnostic and maintenance functions on the control module in response to commands from an external computer interfaced with the control module.

3. The system of claim 1 wherein the processing means further comprises:

means for enabling a quiet mode;

means for enabling an advanced alert mode;

means for enabling a caution alert mode;

means for enabling a warning alert mode; and means for enabling a disconnect mode.

4. The system of claim 1 wherein the portable means for storing comprises a magnetic stripe card, said card having a data storage area comprising:

a name identification field for storing the identity of a card holder;

a card identification field for storing inventory control information on the magnetic stripe card;

an alert initiation field for storing information describing when to initiate the progressive alarm modes; and an alarm set field for storing data controlling actuation and function of the progressive alarm modes.

* * * * *